(12) United States Patent
Guo

(10) Patent No.: US 7,259,353 B2
(45) Date of Patent: Aug. 21, 2007

(54) COMPACT COAXIAL NOZZLE FOR LASER CLADDING

(75) Inventor: Wen Guo, Greenville, SC (US)

(73) Assignee: Honeywell International, Inc., Morristown, NJ (US)

( * ) Notice: Subject to any disclaimer, the term of this patent is extended or adjusted under 35 U.S.C. 154(b) by 103 days.

(21) Appl. No.: 10/956,991

(22) Filed: Sep. 30, 2004

(65) Prior Publication Data
US 2006/0065650 A1    Mar. 30, 2006

(51) Int. Cl.
B23K 26/34 (2006.01)
B23K 26/14 (2006.01)

(52) U.S. Cl. .............................. 219/121.63; 219/121.84

(58) Field of Classification Search .......... 219/121.84, 219/121.63, 121.64
See application file for complete search history.

(56) References Cited

U.S. PATENT DOCUMENTS

| | | | |
|---|---|---|---|
| 4,724,299 A | 2/1988 | Hammeke | |
| 4,804,815 A | 2/1989 | Everett | |
| 5,043,548 A | 8/1991 | Whitney et al. | |
| 5,160,822 A * | 11/1992 | Aleshin | 219/121.64 |
| 5,321,228 A | 6/1994 | Krause et al. | |
| 5,418,350 A | 5/1995 | Freneaux et al. | |
| 5,477,026 A | 12/1995 | Buongiorno | |
| 5,837,960 A | 11/1998 | Lewis et al. | |
| 5,961,862 A | 10/1999 | Lewis et al. | |
| 6,172,327 B1 * | 1/2001 | Aleshin et al. | 219/121.64 |
| 6,316,744 B1 | 11/2001 | Nowotny et al. | |
| 6,388,227 B1 | 5/2002 | Dykhno et al. | |
| 6,423,926 B1 | 7/2002 | Kelly | |
| 6,534,745 B1 | 3/2003 | Lowney | |
| 2005/0056628 A1 * | 3/2005 | Hu | 219/121.84 |
| 2005/0120941 A1 * | 6/2005 | Hu et al. | 117/1 |
| 2006/0266740 A1 * | 11/2006 | Sato et al. | 219/121.84 |

FOREIGN PATENT DOCUMENTS

JP    9-70682 A  *  3/1997

* cited by examiner

Primary Examiner—Geoffrey S. Evans
(74) Attorney, Agent, or Firm—Ingrassia Fisher & Lorenz

(57) ABSTRACT

The present invention provides a compact coaxial nozzle useful in laser welding operations where the welding piece has a restricted or confined geometry. The nozzle is generally conical in shape, terminating in a relatively small tip. The nozzle includes a central laser discharge opening. The conical shape allows movement of the nozzle in confined areas. The nozzle includes a cooling jacket for proving coolant to the nozzle. The nozzle also includes a powder mixing chamber that provides good mixing of powdered filler material with a coaxial discharge around the laser. Finally, the nozzle further provides for inert gas to pass from an upper inlet, through passageways, out of a ring discharge. The ring discharge is also coaxially disposed around the central laser. Further the ring discharge provides mixing of the inert gas in order to minimize turbulent flow problems associated with restrictor plates.

12 Claims, 4 Drawing Sheets

COMPACT COAXIAL NOZZLE FOR LASER CLADDING

FIELD OF THE INVENTION

The present invention relates to laser cladding with powdered filler. More particularly, the invention relates to a compact coaxial nozzle that may be used in welding applications where the confined geometry of the weldpiece requires a small nozzle to gain access to the welding surface.

BACKGROUND OF THE INVENTION

Welding techniques such as laser welding are being used more frequently as a means to repair and restore various types of worn components. Laser welding operations include procedures such as the welding or joining or parts and material deposition or cladding. Laser welding has found particular application in the repair of gas turbine engine components. These components are frequently expensive such that their repair, rather than replacement, is economically justified. Further the components are often made of high strength, high performance alloys such that other welding repair techniques will not service these materials, unless they are combined with other methods such as a pre-weld heat treatment. The trend is to push turbine engine components to still higher levels of performance, and thus engines will continue to see components with high strength and high performance materials. Consequently there is an ongoing need to improve the laser welding methods that will be used with these types of components.

Recently it has been found that conventional laser welding equipment will not adequately repair certain kinds of gas turbine engine components. The blisk, for example, is a development in the design of gas turbine engine components that calls for repair methods that differ from those used with previous components. Similar to the blisk are other gas turbine engine components such as the impeller and other rotor/airfoil devices.

A blisk is an integrally structured airfoil and rotor device in which airfoils are integrally formed with the perimeter of a rotor disk by, for example, integral casting. This design provides the advantage of eliminating the connection between individual airfoils and the rotor at a dovetail. The blisk, by having a unitary construction, also provides a strong mechanical connection between the airfoil region and the rotor disk region thereby allowing for a more efficient positioning of the airfoils. This results in an improved performance of the blisk in terms of weight and component size.

The development of the blisk as a gas turbine engine component has presented challenges with respect to repair strategies. Individual airfoils are now permanently attached to the rotor disk, which means that damaged airfoils cannot easily be removed for repair, as has been done with individual turbine blades. Nonetheless, blisks do have a normal life cycle and must be repaired or replaced at the end: Blisks are impacted by foreign objects such as sand, dirt, and other such debris. Blade leading edge damage, for example, is a common failure experienced in blisks. The leading edge is subject to foreign object damage or erosion after a period of service time.

The option of throwing out worn engine components such as blisks and replacing them with new ones is not an attractive alternative. Blisks are very expensive due to costly material and manufacturing processes. Consequently there is a strong financial need to find an acceptable and efficient repair method for turbine blisks.

Blisks, and other rotor devices, used in modern gas turbine engines are frequently castings from a class of materials known as superalloys. Disadvantageously, the superalloys generally are very difficult to weld successfully. Traditional repair methods have proven less than satisfactory for superalloy materials. Known welding techniques often include heating an airfoil to high temperatures, ranging from 1800° F. to 2000° F. before the welding process. However, at such an elevated temperature the airfoil may experience heat cracking and fracturing, rendering the blade unusable for further engine service. Other welding techniques similarly suffer from a lack of thermal control and provide too much localized heat during welding to render an effective repair. Superalloys are susceptible to microcracking during localized heating.

In addition to the welding challenges presented by the component material, the geometrical configuration of blisks, impellers, and similar devices also makes conventional welding very difficult. The complex geometry of the airfoil, and particularly, the shape of the leading edge, makes it difficult to deposit filler or cladding material thereon. It is often necessary to change the orientation of a welding nozzle with respect to the airfoil leading edge. However, in doing so, the nozzle or other welding apparatus may impact neighboring airfoils. The confined geometry of the airfoil thus makes it difficult to apply a laser beam to points other than the extreme outer surfaces of a blisk using conventional equipment.

Thus, laser welding performed with known designs of laser nozzles has shown the drawbacks of the prior art. In one aspect laser nozzles are bulky. They frequently include a shielding plate and a shielding gas housing. The shielding plate has been used to protect the nozzle from heat and debris generated during the laser welding operation. A shielding gas housing is the structure that collects shielding gas and allows it to be dispensed toward the weldpiece. However, these pieces of the prior art nozzles often interfere with positioning and movement of the nozzle. It would be desired to redesign a laser welding nozzle so as to eliminate these bulky and cumbersome structures.

Another shortcoming that has become apparent with known laser welding nozzles relates to the transmission of shielding gas through the shielding plate itself. The shielding plate often has small holes which allow shielding gas to pass through. However, the position of these holes can cause turbulence in the flow patterns of the shielding gas. Turbulence can degrade the quality of the inert gas shielding. It would thus also be desired to develop a laser welding nozzle that minimizes turbulence in the gas flow and improves the coverage provided by the inert gas shield.

Hence, there is a need for an improved coaxial nozzle that addresses one or more of the above-noted drawbacks and needs. Namely, a coaxial nozzle for use with laser welding is needed that is compact in size so that it may be used with parts having confined spaces and/or a nozzle that eliminates bulky structures and/or a nozzle that better directs shielding gas around the laser. Finally, it would be desired to provide an improved compact coaxial laser welding nozzle that allows laser welding repair on items for which it has previously been unable to perform laser welding repair. Finally it is desired that a nozzle be provided that, by virtue of the foregoing, therefore realizes a cost savings with respect to alternative repair methods. The present invention addresses one or more of these needs.

SUMMARY OF THE INVENTION

The present invention provides a compact coaxial nozzle that is useful in performing laser welding repairs such as laser cladding. The nozzle has a conical, streamlined contour such that it may be used on components with complex curvature and confined geometry, such as for example, turbine engine blisks and impellers. Further the nozzle distributes shielding gas through a ring passage, thus improving on the quality of inert gas blanketing achieved by other distributor plate arrangements. Finally, the nozzle may be used with known laser welding equipment.

In one embodiment, and by way of example only, there is provided a nozzle for use in laser welding operations comprising a housing with a top plate, outer wall, and central projection; the outer wall of the housing defining an opening such that a laser projected from the central projection exits the nozzle through the opening; the housing defining a nozzle interior and a nozzle exterior; the housing defining a cooling jacket located within the nozzle interior wherein the cooling jacket encircles the central projection and is enclosed by the outer wall and top plate; the cooling jacket capable of receiving cooling liquid; the housing further defining a powder convergance chamber within the nozzle interior wherein the powder convergance chamber is capable of receiving powdered filler from the nozzle exterior and discharging the powdered filler through the opening; and the housing further defining a gas passageway wherein the gas passageway is capable of receiving inert gas from the nozzle exterior and discharging the inert gas in a concentric circle around the opening. The housing may be fabricated in part of a copper alloy. A coolant ingress and egress providing fluid communication between the cooling jacket and the nozzle exterior may be included in the nozzle. The outer wall may define a ring opening in fluid communication with the gas passageway. The outer wall of the housing may define more than one gas passageways. The top plate of the housing may define a number of powder apertures capable of admitting powdered filler from the nozzle exterior through the powder apertures and into the powder convergance chamber. The outer wall and central projection may define a funnel area capable of concentrating powder filler.

In a further embodiment, still by way of example only, there is provided a compact nozzle for use in laser cladding operations comprising: a conically shaped housing with a top plate and outer wall, the housing defining an inner region and an outer region, the housing further having a circular opening centered on a central axis; a central projection disposed along the central axis of the housing that is capable of discharging a laser through the opening of the housing; a cooling jacket within the housing that encircles the central projection; a powder convergance chamber within the housing that encircles the central housing; a gas passageway within the housing; and a ring opening around the nozzle opening in fluid communication with the gas passageway. The nozzle may further include at least two gas passageways connected with an inert gas supply. The ring opening may be a groove in the outer wall of the housing, and it may extend along the outer wall up to a point about horizontally level with the end of the central projection. The ring opening disperses inert gas in a concentric circle around the central axis of the nozzle. The nozzle may further include a number of powder apertures that provide fluid communication between the inner and outer region of the housing, and the powder apertures may provide a conduit for powder filler to pass from the outer region of the nozzle into the powder convergance chamber. The outer wall may be set at an angle of between about 20 and about 50 degrees measured relative to the central axis of the nozzle. The housing and central projection may define a funnel area. Further, the outer wall defines an inner surface, and the central projection defines an angled surface, and the area between inner surface of the outer wall and the angled surface of the central projection may define a funnel area. The funnel area can generate a discharge of powder in concentric relation to the laser. When the outer wall defines an inner surface, and the central projection defines an angled surface, the angle of these two surfaces may substantially parallel; further the angle of the surfaces may be between about 20 and about 50 degrees measured relative to the central axis of the nozzle.

In still a further embodiment, and still by way of example only, there is provided a method for performing laser welding comprising the steps of: projecting a laser through a central projection; cooling the nozzle by providing cooling water through a cooling jacket that encircles the central projection by admitting the cooling water into the cooling jacket through an ingress, circulating water through a cooling jacket, and removing the water through an egress; discharging powdered filler through the nozzle by admitting powder through a top plate aperture, gathering powder in a powder convergance chamber, and emitting powder through an opening; and blanketing a welding target with shielding gas by admitting gas into a nozzle through a gas inlet, passing the gas through the nozzle in a passageway, and directing gas onto a welding target through a ring opening. The step of discharging powdered filler may further comprise concentrating powdered filler in a funnel. The method may further comprise discharging powdered filler concentrically with the laser, and directing gas concentrically with the laser.

Other independent features and advantages of the compact coaxial nozzle will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
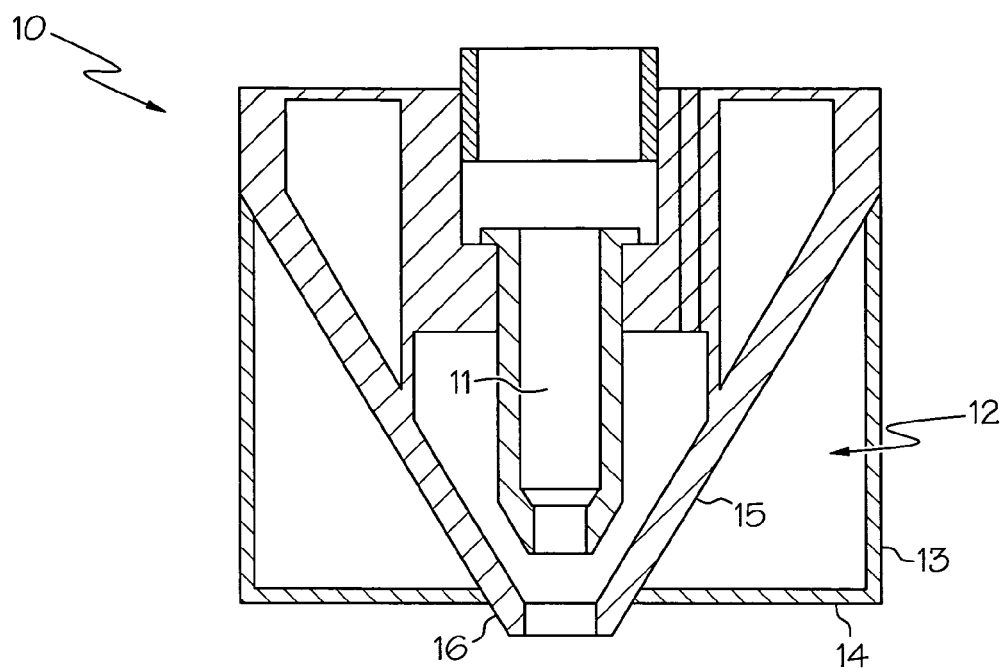
FIG. 1 is a side view of a prior art nozzle.

Referring now to FIG. 1 there is shown a representation of a prior art nozzle. The nozzle 10 includes a central chamber 11 through which is projected the laser. Chamber 11 includes laser transmission means such as fiber optic cables or laser-carrying channels and beam guides. Central chamber 11 extends until it terminates at tip 16 which is the point where a laser exits nozzle 10. The prior art nozzle 10 is also characterized by a cavity 12. Cavity. 12 extends circumferentially around the central area of the nozzle. Cavity 12 is bounded by outer wall 13, aperture plate 14, and inner wall 15. Aperture plate 14 is shown further in FIG. 2.

Figure 2:
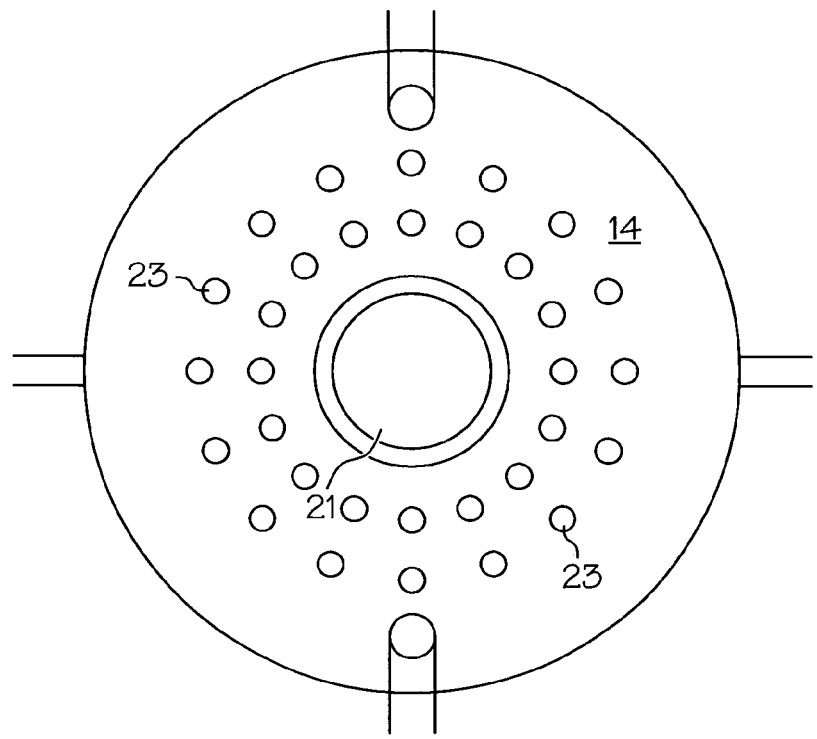
FIG. 2 is a bottom view of a prior art nozzle.

FIG. 2 shows a bottom view of prior art nozzle 10. In this view the nozzle has laser discharge area 21, which is the central area shown in FIG. 2. The remaining annular or circular structure is aperture plate 14. Aperture plate further includes multiple apertures 23.

In the operation of prior art nozzle 10, shielding gas is admitted into cavity 12. The gas is directed into cavity 12 through a device such as a tubing and connection, which are not shown. The gas then exits cavity 12 through apertures 23 in aperture plate 22. However, two drawbacks have become apparent with this structure and method of operation.

One drawback relates to the bulky shape of nozzle 10. It will be noted that in the cross-section of FIG. 1 the overall shape of the prior art nozzle is somewhat rectangular or box-like. In three dimensions, the nozzle is generally cylindrical in shape. Cavity 12 extends to a certain distance in a lateral direction from tip 16. This shape has the drawback of limiting the maneuverability of the nozzle, particularly with respect to welding objects having surfaces with a complex curvature. The external boundaries to cavity 12, outer wall 13 and aperture plate 14, may hit against portions of a welding target, and thus obstruct movement of the nozzle.

Movement of prior art nozzle 10 is also inhibited by the bulky structure required by cavity 12. In certain welding operations it is desired to move tip 16 to a point close to the surface of the welding target. Further, if the target is a shape with curvature, it may be desired to swing or turn nozzle so as to maintain the nozzle oriented in a normal direction relative to the welding surface. These maneuvers may be blocked when structures of the nozzle impact portions of the weld piece.

A further drawback relates to the discharge of gas through apertures 23. It has been noted that shielding gas exits apertures 23 and passes to the welding target with a turbulent flow. Turbulent flow is undesirable because it lessens the quality of the inert gas blanketing over the target. Turbulent flow allows oxygen in the surrounding atmosphere to access the area being welded, and the presence of oxygen potentially lessens the quality of the weld.

It has now been discovered that an alternative nozzle design eliminates these drawbacks. The design eliminates the old inert gas cavity structure and streamlines the profile of the nozzle.

Figure 3:
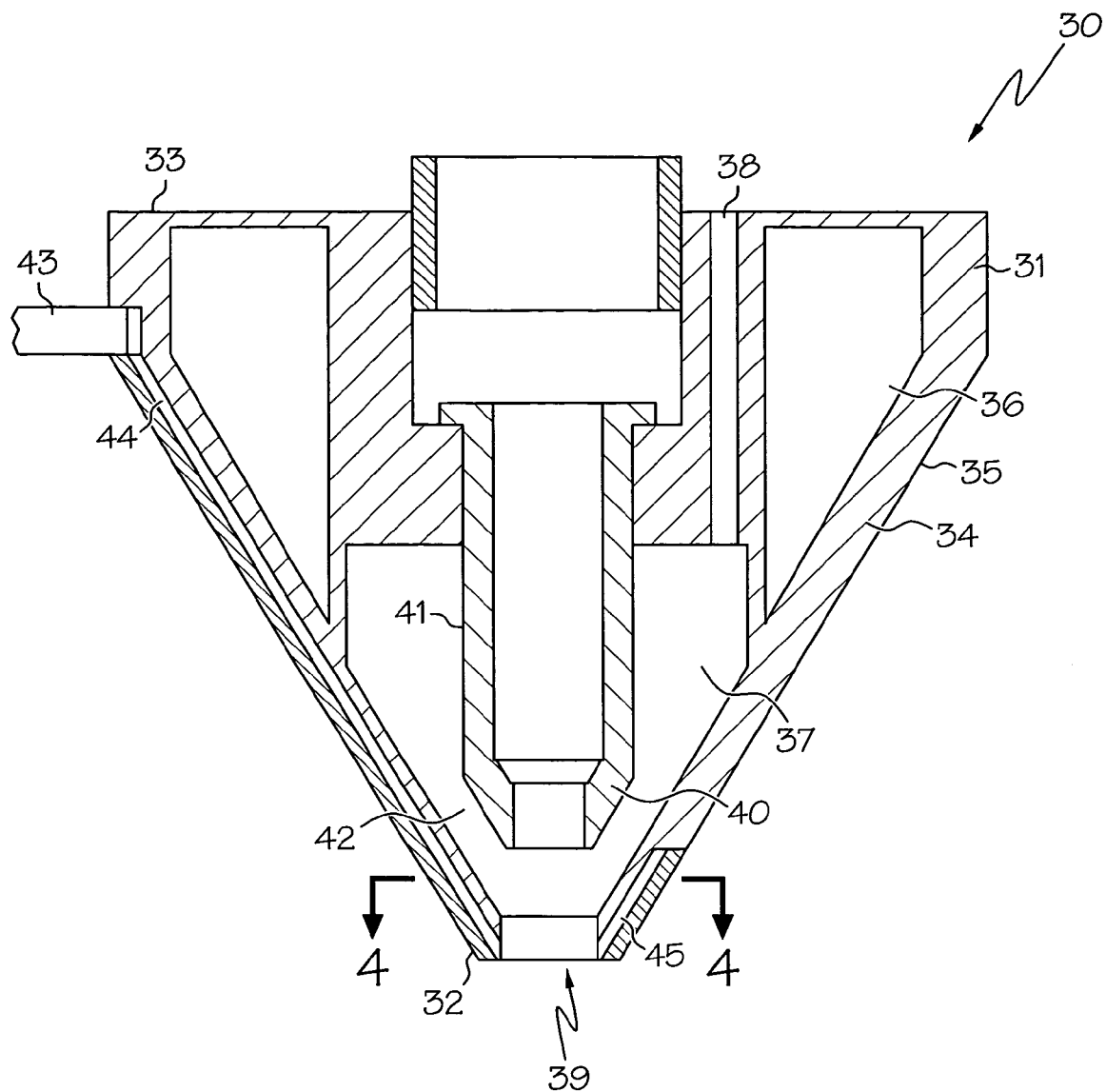
FIG. 3 is a cross-sectional view of a compact coaxial nozzle according to an embodiment of the present invention taken along line 3-3 of FIG. 3.
Figure 5:
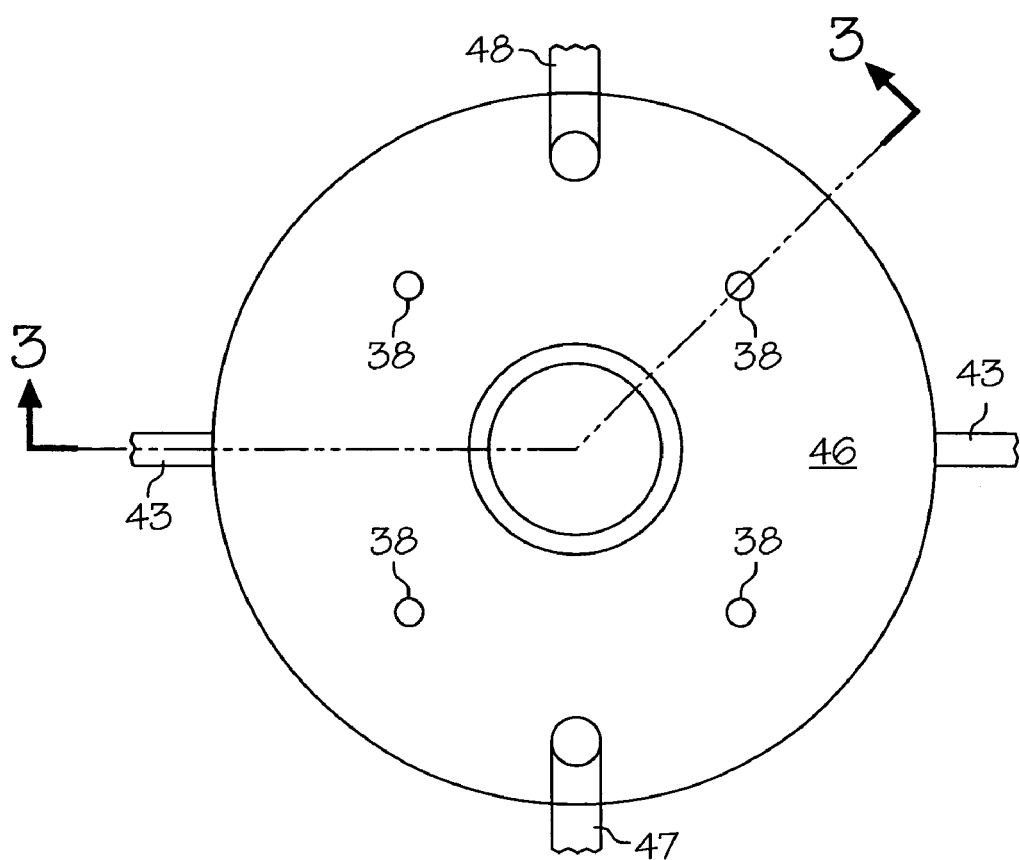
FIG. 5 is a top view of a compact coaxial nozzle of FIG. 3.

Referring now to FIG. 3 there is shown an embodiment of a compact coaxial nozzle. It is noted that line 3-3 shown in FIG. 5 represents that angle of projections that are displayed in FIG. 3. Thus, the left hand side and right hand side in FIG. 3 are vertical cross sections offset by 45°.

Nozzle 30 has housing 31 or body as its principal structure. As illustrated, housing 31 is characterized by various chambers and hollow areas which are described further below. As shown in the vertical cross-section of FIG. 3 nozzle 30 is generally conic in shape. Thus, nozzle 30 includes a central axis running vertically through the shape of the nozzle. Further the nozzle structure defines an outer region and an inner region. Nozzle 30 includes a tip 32 at the lower or distal end of nozzle 30. Opening 39 is present at the tip area of nozzle 30. Opening is preferably circular and is centered around the central axis. At the opposite vertical direction from tip, in FIG. 3, is top plate 33 or upper body. Housing 31 includes outer wall 34 forming one boundary of nozzle 30. Outer wall 34 itself has an outer surface 35 and various inner surfaces.

In a preferred embodiment, housing 31 defines cooling jacket 36. Cooling jacket 36 is an open space that runs concentrically around the vertical axis of nozzle 30. Cooling jacket 36 is also concentrically positioned with respect to central projection 40. Cooling jacket 36 is shaped so as to provide a maximum internal volume and maximum surface area. This shape helps to optimize the cooling effect provided by cooling jacket 36. An ingress and egress (not shown in FIG. 3) provide ports through which a cooling fluid, such as chilled water, enters and exits cooling jacket 36. In a preferred embodiment, outer wall 34 provides one boundary of cooling jacket 36. It is noted that outer wall 34 is preferably thin, so that cooling jacket 36 provides adequate cooling thereto.

In a preferred embodiment, housing 31 also defines powder convergance chamber 37 and powder channels 38. Powder channels 38 are conduits through which powdered filler material, such as metal alloy powder, can pass. Typically a carrier gas, such as an inert gas, assists the flow of powder from an outer/exterior region of the nozzle, through channels 38, into the powder convergance chamber 37 (an inner/interior region of the nozzle), and then out the nozzle through opening 39. Powder channels 38 thus provide a passage from a proximal end of nozzle 30 to powder convergance chamber 37. In a preferred embodiment, multiple powder channels 38 are included in nozzle 30; one such embodiment provides four or more channels. Powder channels 38 pass through top plate 33 in one embodiment.

Powder convergance chamber 37 is shaped so as to receive powder, from channels 38, mix, concentrate, and then discharge the powder from nozzle 30 through opening 39. Powder is discharged through opening 39 along with the inert carrier gas that moves the powder. Further this discharge, through the opening is centered along the central axis. The powder convergance chamber 37 can effect a concentration and direction of the powder as it passes through the nozzle. Powder convergance chamber 37 has openings in an upward position (toward the proximal end of nozzle) where powder is received into chamber 37 from channels 38. Chamber 37 is wider, has a greater cross sectional area, at the upper, proximal direction of the chamber. At the lower, distal, end of chamber 37, the chamber narrows until the chamber reaches opening 39. It will be noted that the cross-sectional area of powder convergance chamber is defined in part by the shape of central projection 40.

Central projection 40 is an inner portion of housing 31. In a preferred embodiment, central projection 40 is generally cylindrical in shape, though other configurations are possible. Preferably, central projection 40 is vertically aligned along the nozzle's central axis. Central projection 40 may be a unitary piece with housing 31, or it may be a separate structure disposed within housing 31. In its inner, central axial portion, central projection 40 is hollow and contains means for conveying and directing a laser. Thus, central projection 40 may include known structures such as beam guides, mirrors, lenses, fiber optic cables, and other material for transmitting, projecting, and focusing a laser, as is known in the art. In operation it is preferred that the laser projected from nozzle 30 be projected in a manner centered on the central axis, and through opening 39 so that the laser is coaxial with the opening.

The radially outward portion of central projection 40 includes projection surface 41, and this surface defines a boundary of powder convergance chamber 37. In a preferred embodiment, an upper section of projection surface 41 is generally horizontal in orientation, as shown in FIG. 3, and in a lower section, projection surface 41 then angles inwardly toward the central axis. There is thus defined a space between that portion of the inner surface of outer wall 34 that defines powder convergance chamber 37 and the angled section of projection surface 41. In a preferred embodiment, this space is frustoconical in three-dimensional shape; this space may be referred to as funnel 42. Funnel 42 thus has an upper surface which is provided by the angled portion of projection surface 41. Funnel further has a lower surface, which is defined by the inner surface of outer wall 34 where the outer wall defines the powder convergance chamber 37. The upper and lower surface of funnel 42 are preferably parallel in that both surfaces run at the same, or approximately the same, angle relative to a central axis. It is noted that in other embodiments of funnel 42 its upper surface may run at an angle that differs from that of its lower surface.

Referring still to FIG. 3 there is provided within nozzle 30 the means to project a shielding inert gas therethrough. Nozzle 30 includes one or more gas inlets 43. A gas inlet 43 may be connected to a feeding tube which supplies inert gas from a source to the inlet. Inlet 43 is in fluid communication with gas passageway 44. Passageway 44 is preferably a channel or opening that is drilled or otherwise provided in outer wall 34. Passageway 44 extends from inlet 43 to opening 39. Passageway 44 is of sufficient size and diameter, and there are provided a sufficient number of passageways 44, so that a desired volume of gas may be passed therethrough and at a desired rate. Preferably, nozzle 30 includes two or more passageways 44. Toward tip 32 of nozzle 30 passageway 44 connects with ring opening 45. Ring opening 45 is a space or groove within outer wall 34 that extends from tip 32 of nozzle 30 to a set back distance. A preferred set back distance is, as shown in FIG. 3 approximately at the lower end of central projection 40 on a horizontal line therefrom; however, other distances are possible. It is noted that, preferably, ring opening 45 is cut in all 360° of outer wall, thus providing a continuous, uninterrupted space at opening 39. However, a less than 360° ring opening may be provided.

In operation, ring opening 45 provides a space in which inert gas mixes. As inert gas descends from inlet 43, and through passageways 44, the gas is confined within the passageways. However, once a passageway 44 reaches ring opening 45, the gas becomes free to move and expand in all directions of the area defined by this opening. The gas within ring opening 45 continues to be pushed out as additional gas coming through passageway 44 impinges on the gas in ring opening 45. The result is that a ring-shaped wall of gas exits from nozzle 10 where ring opening 45 terminates at opening 39. The gas discharged through ring opening 45 is concentric and coaxial with respect to opening 39 and the central axis. As shown in FIG. 3, in a preferred embodiment, ring opening 45 terminates at a vertical cutting of outer wall 34.

As shown in FIG. 3 several structures and features of the compact coaxial nozzle run in parallel arrangement, though other configurations are possible. For example, outer wall 34 and funnel 42 have parallel arrangements. Preferably the angle is between about 50 to about 20 degrees measured from the central axis. The angled surface of central projection 40 is also preferably set in this range. And the ring opening 45, structured within outer wall 34, is also within this range.

Figure 4:
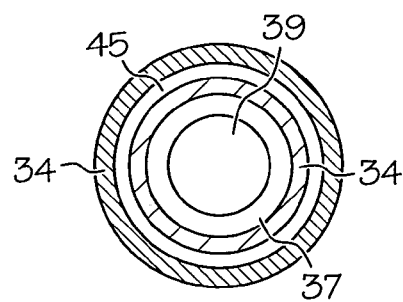
FIG. 4 is a cross-sectional view of a compact coaxial nozzle of FIG. 3 taken at line 4-4.

Referring now to FIG. 4 there is shown a horizontal cross-section of nozzle 30. This cross-section is taken along line 4-4 shown in FIG. 3. In this figure, the nozzle cross-section is generally circular in shape. Moving from the outwardly radial position, toward the center point in FIG. 4, the first portion encountered is outer wall 34. The next portion is an open area which corresponds to ring opening 45. It is noted that ring opening 45 extends in a full 360 degrees at line 4-4. Still moving in an inwardly radial direction, the next portion noted in FIG. 4 is an inner portion of outer wall 34. It is noted that outer wall 34 is divided into two sections by ring opening 45, inner and outer sections. Inward from this inner portion of outer wall 34 is an open area. This open area, may be described, at line 4-4 as describing two areas. The first, outer area is that defined by funnel 42, and the inner area is that smaller circle defined by opening 39. FIG. 4 illustrates the coaxial alignment of features and structures of nozzle 30.

Referring now to FIG. 5 there is shown a top view of nozzle 30. In FIG. 5, the top view of nozzle 30 first shows top plate 46. Top plate 46 is an upper portion housing 31. In part top plate 46 defines the upper boundary of cooling jacket 36. Top plate 46 includes powder channels 38. Also shown at top plate 46 are coolant ingress 47 and egress 48. Finally, inert gas inlets 43 are also shown in FIG. 5. Inlets 43 are not at the same vertical position as top plate 46, but rather as shown in FIG. 3 are, in a preferred embodiment, set lower than top plate.

Preferably the nozzle is made of a copper alloy material such as brass. The nozzle may be made of any of the metallic and composite structures known in the art for laser welding. The nozzle may also be fabricated using known techniques that include, but are not limited to, casting, forging, and machining. Preferably the material is such that can withstand the high temperatures encountered during laser welding.

Figure 6:
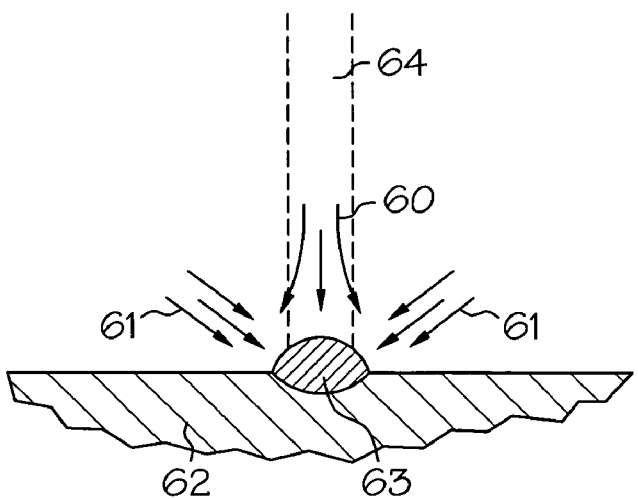
FIG. 6 is a perspective view of a welding operation with an embodiment of the compact coaxial nozzle showing the improved inert gas shielding achieved thereby.

Referring now to FIG. 6, there is shown a preferred usage of the compact coaxial nozzle. FIG. 6 illustrates the improved manner by which the nozzle blankets a weldpiece with inert gas. During a laser welding operation, a weldpiece 62 has a molten pool 63 generated by laser 64. Blanketing the molten pool 63 from an upper position is nozzle gas 60. Nozzle gas 60 is the carrier gas that passes through the body of the nozzle, through the powder convergance chamber 37, as it carries the powder filler therethrough. Note that powder is not illustrated in FIG. 6, however, it too would be present in nozzle gas 60. Simultaneously, shielding gas 61 is directed toward molten pool 63. Shielding gas 61 is that gas discharged through ring opening 45. Thus in three dimensions shielding gas 61 is directed toward molten pool 63 from all 360° locations, although only two such directions can be shown in FIG. 6. As shown by the arrows for nozzle gas 60 and shielding gas 61, the gas discharge provided by the compact coaxial nozzle provides a thorough inert blanketing of the desired area. In another embodiment, an inert gas may also be delivered through central projection 40 (FIG. 3) so as to clean the optical system, and provide additional shielding for powder and the weld.

Figure 7:
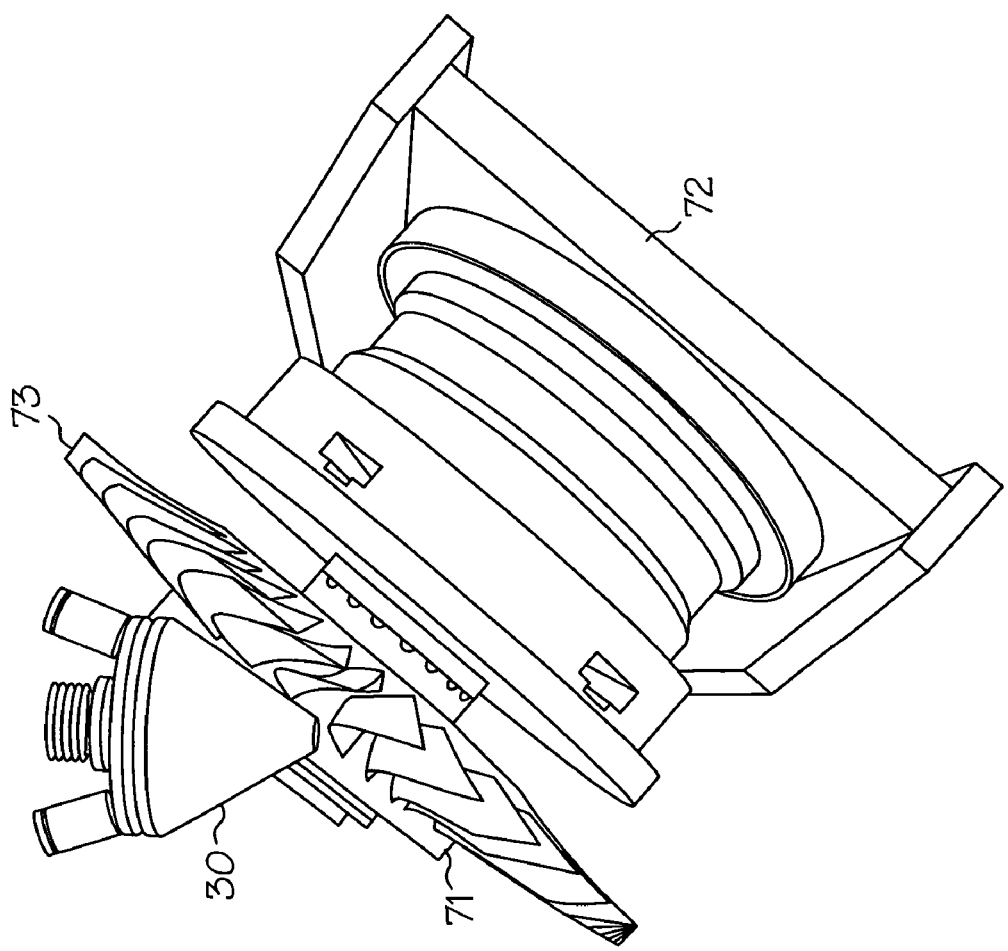
FIG. 7 is an illustration of a welding operation on a gas turbine engine blisk with a compact coaxial nozzle according to an embodiment of the present invention.

Referring now to FIG. 7 there is illustrated an exemplary repair of a gas turbine engine blisk with an embodiment of the compact coaxial nozzle. Blisk 71 is illustrated as positioned on work table 72. The work table has been tilted relative to true horizontal. Nozzle 30 is shown in close proximity to the leading edge of a target airfoil 73. The nozzle, however, is not in contact with the blisk 71. The angled side of the nozzle avoids contact with, for example, an airfoil 73 positioned nearby the target airfoil. Blisk 71 has a typical geometric configuration wherein neighboring airfoils create a confined geometry between them thus leading to space limitations with respect to welding machinery. Nevertheless, the components of the compact coaxial nozzle are sufficiently compact so that welding and physical maneuvering of the nozzle is possible around various positions of an airfoil leading edge.

During the repair, filler material is deposited by laser welding techniques on a welding surface, such as an airfoil leading edge. Preferably, filler material is deposited through the use of a laser cladding. Filler material in powder form is discharged so that it is melted by the laser beam and welds on the desired surface of the workpiece. Processing and welding parameters may be chosen to control thermal input during the welding operation. Further, the area of the laser beam spot and laser velocity are similarly determined in order to regulate the heat experienced by the substrate. Thus, the welding operation avoids microcracking in the weld area and the heat affected zone.

Multiple passes may be used to build up a required dimension of material where one pass overlaps a previous pass and successive passes are laid atop a previous pass. Similarly, the method allows for cladding of an area greater than that covered in a single pass by laying successive passes alongside previous passes thus covering a desired area. If needed, repetitions of the laser welding passes can be done in order to achieve a required level of buildup and/or coverage over a required area; this is accomplished by depositing successive layers of filler material on top of one another. Upon conclusion of a first pass, or other passes, a laser controller can check the thickness of the weld deposit. If needed, additional weld deposits can then be conducted.

Laser welding depositions continue until sufficient material has been deposited. The result is a mass of newly deposited material that occupies a repaired region. The material of the repaired region is fusion welded with the material of the substrate region of the airfoil. Further the weld is characterized by a lack of any degree of cracks, voids, or discontinuities that would disqualify the blisk from service.

The powder or filler used in the laser welding process is preferably compatible with the alloy comprising the workpiece. Compatible powder helps to achieve a suitable weld or cladding. The dimension of filler powder is measured by its mesh size. A preferred powder size for use with the compact coaxial nozzle ranges from +100 mesh to −325.

While the compact coaxial nozzle may be used with laser repairs of many types of structures, it has been found that the nozzle has advantages for those repairs where the weld piece has a confined geometry. For example, in the blisk, the presence of neighboring airfoils around a target airfoil mean that it is difficult to tilt the weld piece if a flat or bulky nozzle is being used. An advantage of the compact coaxial nozzle is the relatively compact size and dimension of the nozzle in the tip area. This size allows the nozzle to be positioned close to a blisk airfoil. Further, the blisk can be tilted and rotated, relative to the nozzle, during the welding operation without impacting the nozzle. In this manner, laser cladding repairs may be performed on an airfoil leading edge, whereas this was not feasible with previous designs. It should be noted that the general shape and structure of a gas turbine blisk is also true of other rotary devices such as turbines found in turbochargers and turbopumps. Thus, the nozzle as described herein may also be used to repair components such as turbine engine compressors, centrifugal compressors, integrally bladed rotors, compressor blades and vanes, fan blades, and turbine blades, all in addition to impellers and blisks. The principles of the invention described herein are thus applicable to these devices as well.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A compact nozzle for use in laser cladding operations comprising:
    a conically shaped housing with a top plate, a lower end, and an outer wall, the housing defining an inner region and an outer region, the housing further having a circular opening centered on a central axis;
    a central projection disposed along the central axis of the housing that is capable of discharging a laser from an end thereof and through the circular opening;
    a cooling jacket within the housing that at least partially encircles the central projection;
    a powder convergance chamber within the housing that at least partially encircles the central projection;
    a gas passageway within the housing; and
    a ring opening formed in the housing outer wall and surrounding the circular opening, the ring opening in fluid communication with the gas passageway and having at least a portion thereof extending along the wall from an open end to a closed end, the open end disposed proximate the housing lower end, and the closed end disposed about horizontally level with the end of the central projection.

2. The nozzle according to claim 1 further comprising at least two gas passageways configured to be connected with an inert gas supply.

3. The nozzle according to claim 1 wherein the ring opening is a groove in the outer wall of the housing.

4. The nozzle according to claim 1 wherein the ring opening disperses inert gas in a concentric circle around the central axis of the nozzle.

5. The nozzle according to claim 1 further comprising a plurality of powder apertures providing fluid communication between the inner and outer region of the housing.

6. The nozzle according to claim 5 wherein the powder apertures provide a conduit for powder filler to pass from the outer region of the nozzle into the powder convergance chamber.

7. The nozzle according to claim 1 wherein the outer wall is at an angle of between about 20 and about 50 degrees measured relative to the central axis of the nozzle.

8. The nozzle according to claim 1 wherein the housing and central projection further define a funnel area.

9. The nozzle according to claim 1 wherein the outer wall defines an inner surface, and the central projection defines an angled surface, and the area between inner surface of the outer wall and the angled surface of the central projection defines a funnel area.

10. The nozzle according to claim 9 wherein the funnel area generates a discharge of powder in concentric relation to the laser.

11. The nozzle according to claim 1 wherein the outer wall defines an inner surface, and the central projection defines an angled surface, and the angle of these two surfaces is substantially parallel.

12. The nozzle according to claim 11 wherein the angle of the surfaces is between about 20 and about 50 degrees measured relative to the central axis of the nozzle.

* * * * *